US012325347B2

(12) United States Patent
Johansson et al.

(10) Patent No.: US 12,325,347 B2
(45) Date of Patent: Jun. 10, 2025

(54) CARGO RESTRAINING SYSTEM FOR A VEHICLE, A VEHICLE COMPRISING A CARGO RESTRAINING SYSTEM, AND A METHOD FOR OPERATING A CARGO RESTRAINING SYSTEM FOR A VEHICLE

(71) Applicants: Ningbo Geely Automobile Research & Development Co., Ltd., Ningbo (CN); Zhejiang Geely Holding Group Co., Ltd., Zhejiang (CN)

(72) Inventors: Jonathan Johansson, Gothenburg (SE); Magnus Nilsson, Floda (SE)

(73) Assignees: Ningbo Geely Automobile Research & Development Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 307 days.

(21) Appl. No.: 17/979,445

(22) Filed: Nov. 2, 2022

(65) Prior Publication Data

US 2023/0046707 A1    Feb. 16, 2023

Related U.S. Application Data

(63) Continuation of application No. PCT/CN2021/092268, filed on May 8, 2021.

(30) Foreign Application Priority Data

May 25, 2020    (EP) .................................... 20176269

(51) Int. Cl.
*B60P 7/08* (2006.01)
*B60R 5/04* (2006.01)
(52) U.S. Cl.
CPC ........... *B60P 7/0876* (2013.01); *B60P 7/0838* (2013.01); *B60R 5/045* (2013.01)

(58) Field of Classification Search
CPC ...... B60P 7/0876; B60P 7/0838; B60R 5/045; B60R 2011/0036
(Continued)

(56) References Cited

U.S. PATENT DOCUMENTS

| 4,717,298 A | 1/1988 | Bott |
| 5,772,370 A * | 6/1998 | Moore .................... B60R 7/005 |
| | | 410/97 |

(Continued)

FOREIGN PATENT DOCUMENTS

| CN | 106256609 A | 12/2016 |
| DE | 1964772 A1 | 7/1971 |

(Continued)

OTHER PUBLICATIONS

International Search Report from International Application No. PCT/CN2021/092268, mailed Aug. 2, 2021, 2 pages.

*Primary Examiner* — Amy R Weisberg
*Assistant Examiner* — Denise Lynne Esquivel
(74) *Attorney, Agent, or Firm* — Tucker Ellis LLP (57) ABSTRACT

A cargo restraining system for a vehicle includes an extended flexible structure movably connected to a positioning arrangement. The flexible structure is adapted for holding cargo arranged on a cargo floor of a vehicle cargo compartment in position in relation to the cargo floor, and the flexible structure is sized to cover at least a part of the cargo floor. The positioning arrangement is adapted for enabling movement of the flexible structure between a storage position and a load securing position, where in the storage position the flexible structure is adapted to be positioned on a first height from the cargo floor, and where in the load securing position the flexible structure is adapted to be positioned on a second height from the cargo floor. The first height is different from the second height.

15 Claims, 6 Drawing Sheets

(58) Field of Classification Search
USPC ............ 296/24.43, 24.33, 37.16; 410/96, 97, 410/100, 118
See application file for complete search history.

(56) References Cited

U.S. PATENT DOCUMENTS

| | | | |
|---|---|---|---|
| 6,099,222 | A | 8/2000 | Moore |
| 6,349,986 | B1 | 2/2002 | Seel |
| 6,827,385 | B2 | 12/2004 | Mobley |
| 6,921,119 | B2 * | 7/2005 | Haspel ..................... B60R 7/02 296/37.16 |
| 2002/0096900 | A1 | 7/2002 | Moore |
| 2005/0082859 | A1 | 4/2005 | Walter |
| 2019/0047479 | A1 | 2/2019 | Faruque |

FOREIGN PATENT DOCUMENTS

| | | | |
|---|---|---|---|
| DE | 202005004861 U1 | 7/2005 | |
| DE | 102015220559 A1 | 4/2017 | |
| EP | 0659611 A1 | 6/1995 | |
| EP | 2433834 B1 * | 6/2013 | ............ B60P 7/0876 |
| WO | 9718972 A1 | 5/1997 | |

* cited by examiner

CARGO RESTRAINING SYSTEM FOR A VEHICLE, A VEHICLE COMPRISING A CARGO RESTRAINING SYSTEM, AND A METHOD FOR OPERATING A CARGO RESTRAINING SYSTEM FOR A VEHICLE

RELATED APPLICATION DATA

This application is a continuation of International Patent Application No. PCT/CN2021/092268, filed May 8, 2021, which claims the benefit of European Patent Application No. 20176269.7, filed May 25, 2020, the disclosures of which are incorporated herein by reference in their entireties.

TECHNICAL FIELD

The present disclosure relates to a cargo restraining system for a vehicle comprising an extended flexible structure movably connected to a positioning arrangement. The flexible structure is adapted for holding cargo arranged on a cargo floor of a vehicle cargo compartment in position in relation to the cargo floor, and the flexible structure is sized to cover at least a part of the cargo floor. The disclosure further relates to a vehicle comprising a cargo restraining system and a method for operating a cargo restraining system for a vehicle.

BACKGROUND

Cargo restraining systems are used in vehicles for securing cargo, such as luggage or other objects and goods, transported in the cargo compartment of the vehicle. When the luggage or other objects are loaded on the cargo floor of the cargo compartment, the luggage or objects commonly have a tendency of being displaced or tumbling on the cargo floor during transport. This is especially of concern for goods transported in station wagon, SUV, or hatchback types of vehicles, where displaced objects may pose a danger to occupants of the vehicle during braking or turning of the vehicle. To avoid this, cargo straps, cargo nets, or other load securing structures, can be used for holding the luggage or objects in position in relation to the cargo floor. The use of cargo straps or cargo nets are often complicated and time consuming for the user of the vehicle, since they have to be secured and tightened manually.

There is thus a need for an improved cargo restraining system that is easy to handle for the users of the vehicle, where the cargo restraining system is avoiding that the luggage or other objects are being displaced during transport, and securing that the luggage or other objects are held in place in relation to the cargo floor during transport. The cargo restraining system should further provide a safe transport of the cargo, preventing that the occupants of the vehicle are hit by an object for example during braking or turning of the vehicle.

SUMMARY

An object of the present disclosure is to provide a cargo restraining system, a vehicle comprising a cargo restraining system, and a method for operating a cargo restraining system where the previously mentioned problems are avoided. This object is at least partly achieved by the features of the independent claims. The dependent claims contain further developments of the cargo restraining system and the vehicle comprising a cargo restraining system.

The disclosure concerns a cargo restraining system for a vehicle comprising an extended flexible structure movably connected to a positioning arrangement. The flexible structure is adapted for holding cargo arranged on a cargo floor of a vehicle cargo compartment in position in relation to the cargo floor, and the flexible structure is sized to cover at least a part of the cargo floor. The positioning arrangement is adapted for enabling movement of the flexible structure between a storage position and a load securing position. In the storage position, the flexible structure is adapted to be positioned on a first height from the cargo floor. In the load securing position, the flexible structure is adapted to be positioned on a second height from the cargo floor. The first height is different from the second height.

Advantages with these features are that cargo, such as luggage or other objects and goods, transported in the cargo compartment of the vehicle can be efficiently secured. The cargo restraining system is preventing that the luggage or other objects loaded on the cargo floor are being displaced during transport. With the cargo restraining system, the safety for the occupants is increased, since the objects are held in place during braking or turning of the vehicle. The positioning arrangement is providing a simple and efficient structure for holding the luggage or other objects in position in relation to the cargo floor with the flexible structure, which arrangement is easy to handle for the users of the vehicle through the positioning of the flexible structure on different heights. The cargo restraining system is providing a safe transport of the luggage or objects, preventing the occupants of the vehicle from being hit by an object during braking or turning of the vehicle.

According to an aspect of the disclosure, in the storage position the positioning arrangement is adapted for positioning the flexible structure in connection to a ceiling structure of the cargo compartment. With the positioning of the flexible structure in connection to the ceiling of the vehicle, a simple loading of the cargo compartment is achieved, where the flexible structure is not obstructing the cargo compartment when luggage or other objects are being placed on the cargo floor. When opening the tailgate or similar rear door structure of the vehicle, the users of the vehicle have an unobstructed access to the cargo compartment in the storage position.

According to another aspect of the disclosure, in the load securing position the positioning arrangement is adapted for positioning the flexible structure in connection to the cargo floor. With the positioning of the flexible structure in connection to the cargo floor of the vehicle, a simple arrangement for holding the luggage or objects in place during transport is achieved. The flexible structure is in this position stretched out or extended over the objects for a secure and safe positioning in connection to the cargo floor. The flexible structure is in the load securing position preventing luggage or objects from being displaced on the cargo floor.

According to an aspect of the disclosure, the positioning arrangement comprises two or more holding devices. A positioning member is movably connected to each holding device. The flexible structure comprises two or more connection members at different positions along an outer periphery. Each connection member is adapted to be connected to a corresponding positioning member. The connection between corresponding holding devices with the positioning members and the connection members are providing an efficient holding arrangement for the flexible structure, where the flexible structure is allowed to move between the first and second heights in the storage position and the load securing position.

According to another aspect of the disclosure, each holding device comprises a track. Each positioning member is adapted to be slidably arranged in a corresponding track for positioning the flexible structure between the storage position and the load securing position. The track of each holding device is securing an efficient displacement of the slidably connected positioning member, and each positioning member is allowed to slide in relation to the track, positioning the flexible structure in the first and second heights for the respective positions.

According to a further aspect of the disclosure, each positioning member is connected to an actuator. The actuator is adapted for moving each positioning member in relation to its corresponding holding device for positioning the flexible structure between the storage position and the load securing position.

According to an aspect of the disclosure, each positioning member is connected to the actuator via a wire structure. Each wire structure is adapted for displacing the corresponding positioning member in relation to the corresponding holding device upon activation of the actuator. The wire structures are used for moving the flexible structure in relation to the positioning arrangement through the positioning members. The wires are connected to the actuator and the positioning members, and when operating the actuator, the flexible structure is moved into the desired position.

According to another aspect of the disclosure, the actuator comprises force limiters. The force limiters are preventing that the users of the cargo restraining systems are injured during use of the system. The force limiters are securing that the operation of the actuator is stopped when a predetermined force level is reached.

According to a further aspect of the disclosure, each positioning member is connected to the corresponding holding device via a spring, where each spring is adapted for displacing the corresponding positioning member in relation to the corresponding holding device.

According to an aspect of the disclosure, the flexible structure is releasably connected to the two or more connection members. The releasable connection is establishing a simple handling of the flexible structure, where the flexible structure easily can be removed from and attached to the positioning arrangement.

According to another aspect of the disclosure, the flexible structure is arranged as a flexible net structure. The flexible net structure is simple in construction and can be used for a secure holding of the luggage or other objects in relation to the cargo floor. The flexible net structure is further lightweight in construction and can be produced at a low cost.

According to a further aspect of the disclosure, the system further comprises a switch, where the switch is adapted for controlling the movement of the flexible structure. The switch is providing a simple and efficient operation of the cargo restraining system.

According to an aspect of the disclosure, the system further comprises an exterior vehicle door arranged in connection to the vehicle cargo compartment. The flexible structure is adapted for being lowered in relation to the cargo floor when the exterior vehicle door is being closed, and/or the flexible structure is adapted for being raised in relation to the cargo floor when the exterior vehicle door is being opened. The positioning of the flexible structure in response to the closing and opening of the exterior vehicle door is providing an efficient function of the system, where the flexible structure automatically is being positioned depending on the exterior vehicle door position.

The disclosure further concerns a vehicle comprising a cargo restraining system as described above.

According to an aspect of the disclosure, the first holding device and the second holding device are arranged at D-pillars of the vehicle, and/or the third holding device and the fourth holding device are arranged at C-pillars of the vehicle. The arrangement of the holding devices at the C-pillars and D-pillars are providing a suitable positioning of the flexible structure in relation to the vehicle.

The disclosure further concerns a method for operating a cargo restraining system for a vehicle, where the system comprises an extended flexible structure movably connected to a positioning arrangement. The flexible structure is adapted for holding cargo arranged on a cargo floor of a vehicle cargo compartment in position in relation to the cargo floor, where the flexible structure is sized to cover at least a part of the cargo floor. The positioning arrangement is adapted for enabling movement of the flexible structure between a storage position and a load securing position. The method comprises the steps: positioning the flexible structure on a first height from the cargo floor in the storage position; and/or positioning the flexible structure on a second height from the cargo floor in the load securing position; where the first height is different from the second height.

Advantages with the method is that cargo, such as luggage or other objects and goods, transported in the cargo compartment of the vehicle can be efficiently secured in the load securing position, and that the flexible structure is positioned at different heights in the storage position and the load securing position. The cargo restraining system is preventing that the luggage or other objects loaded on the cargo floor are being displaced during transport, thus increasing the safety for the occupants. The positioning arrangement is providing a simple and efficient structure for holding the luggage or other objects in position in relation to the cargo floor with the flexible structure, and the arrangement is easy to handle for the users of the vehicle through the positioning of the flexible structure on different heights.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

FIGS. 1A-1D, 2, 3, and 4 schematically shows a cargo restraining system 2 for a vehicle 1 according to the disclosure. The cargo restraining system 2 is used for holding cargo C, such as luggage or other objects and goods, in position when transported in a cargo compartment 1a of the vehicle. The expression cargo may include any suitable types of objects and goods loaded in the cargo compartment 1a, arranged for being held in place by the cargo restraining system 2, and common examples are bags, suitcases, tool boxes, shopping bags, grocery bags, and smaller packages. The cargo restraining system 2 is preventing the cargo C from being displaced in relation to a cargo floor 1b during transport. Unsecured objects may especially be of concern in station wagon, SUV, or hatchback types of vehicles, where displaced objects may pose a danger to occupants of the vehicle during braking or turning of the vehicle, and the cargo restraining system 2 is providing a safe transport of the cargo C, preventing that the occupants of the vehicle are hit by objects during braking or turning of the vehicle.

The cargo restraining system 2 comprises an extended flexible structure 3 movably connected to a positioning arrangement 4. The flexible structure 3 is connected to the positioning arrangement 4 with suitable connection means as will be further described below. The flexible structure 3 may be extended or stretched out when holding the cargo C, as for example shown in FIG. 2.

Figure 1A:
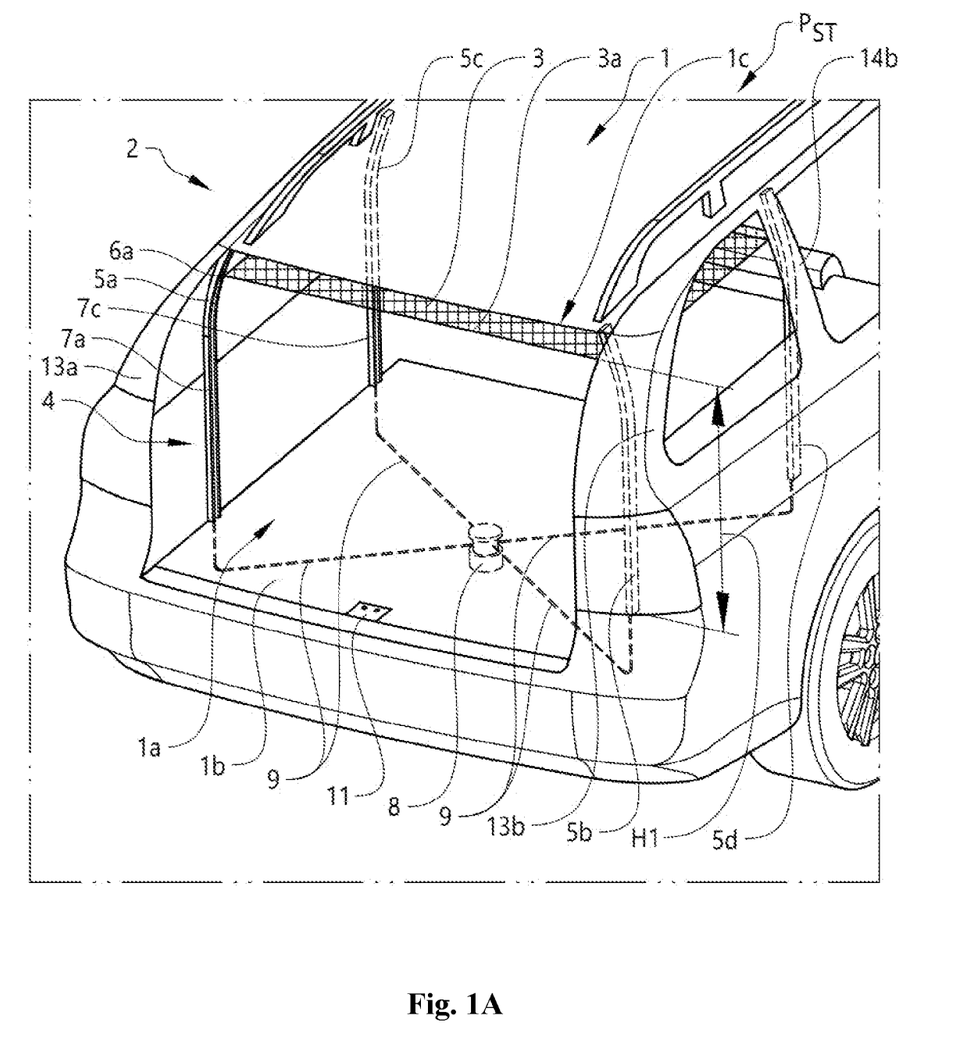
FIGS. 1A-1D show schematically, in a perspective rear view from above, a cargo restraining system in a storage position, an intermediate position, and a load securing position, according to the disclosure.
Figure 1B:
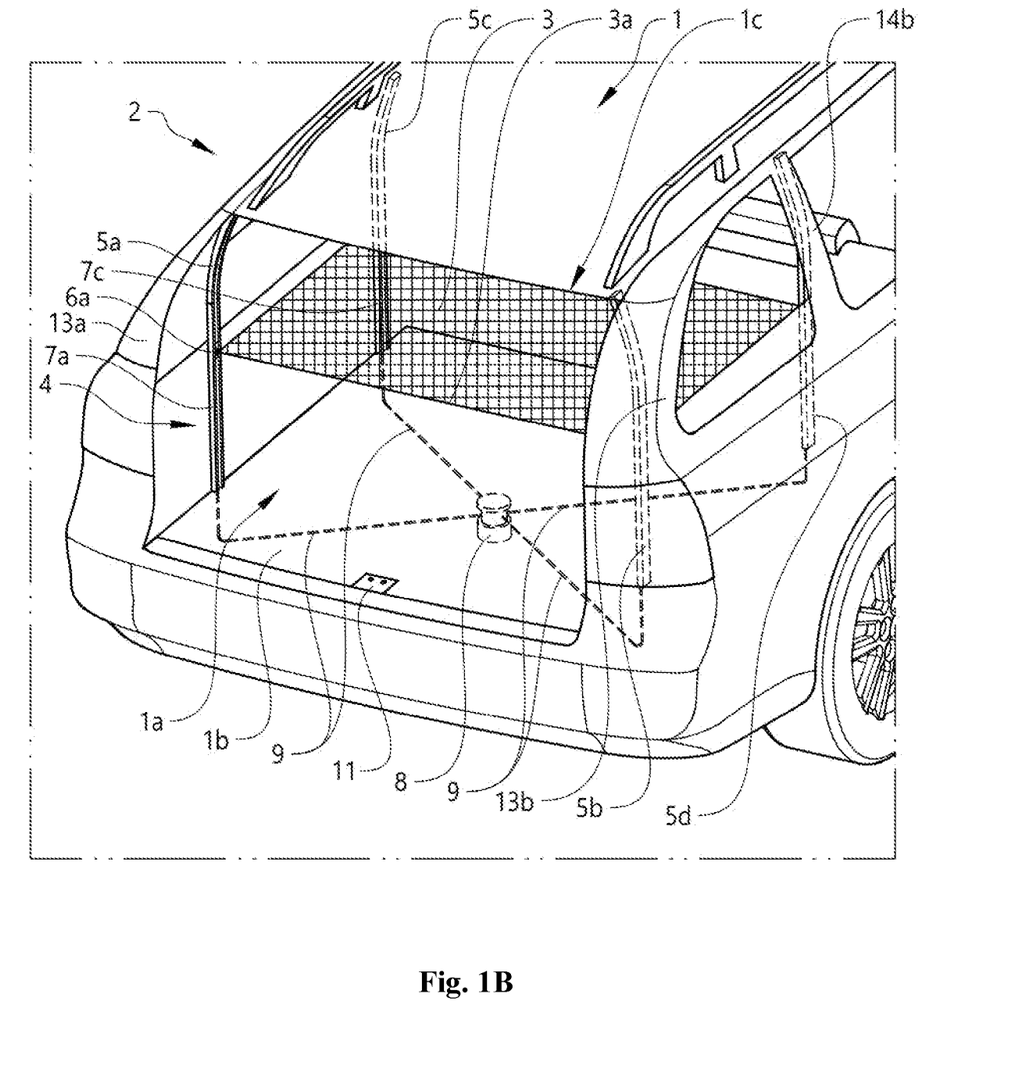
Figure 1C:
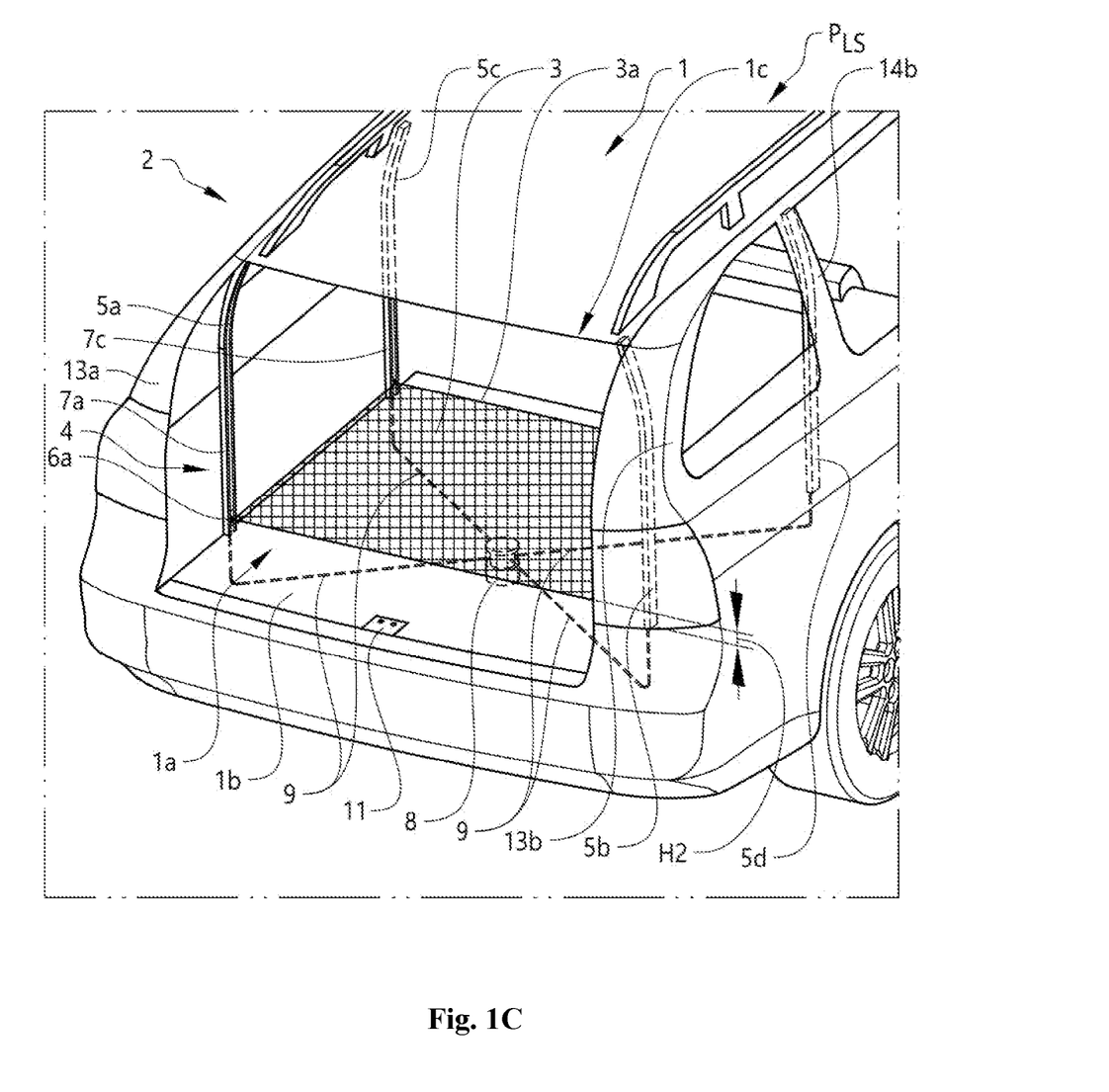
Figure 1D:
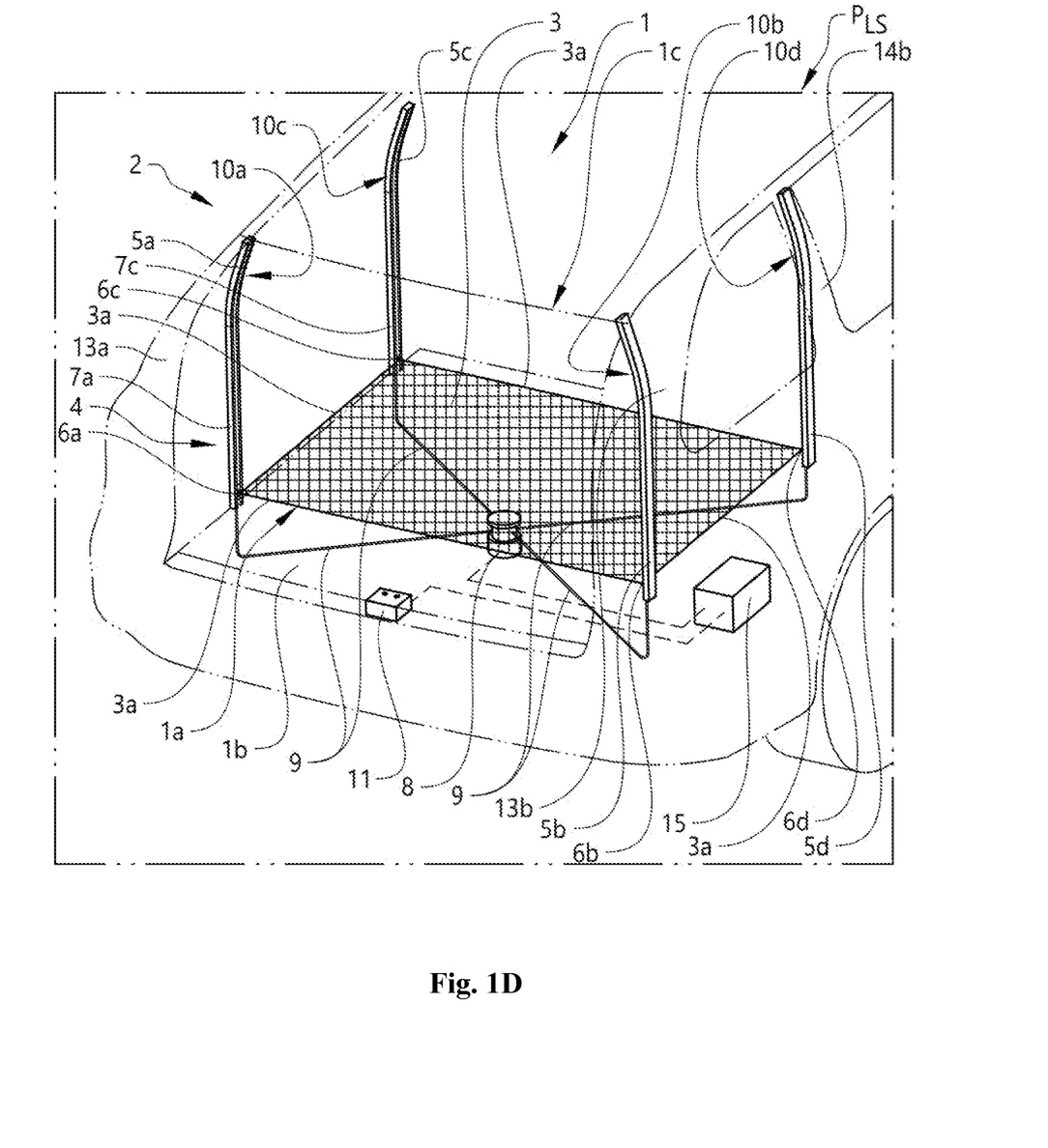
Figure 4:
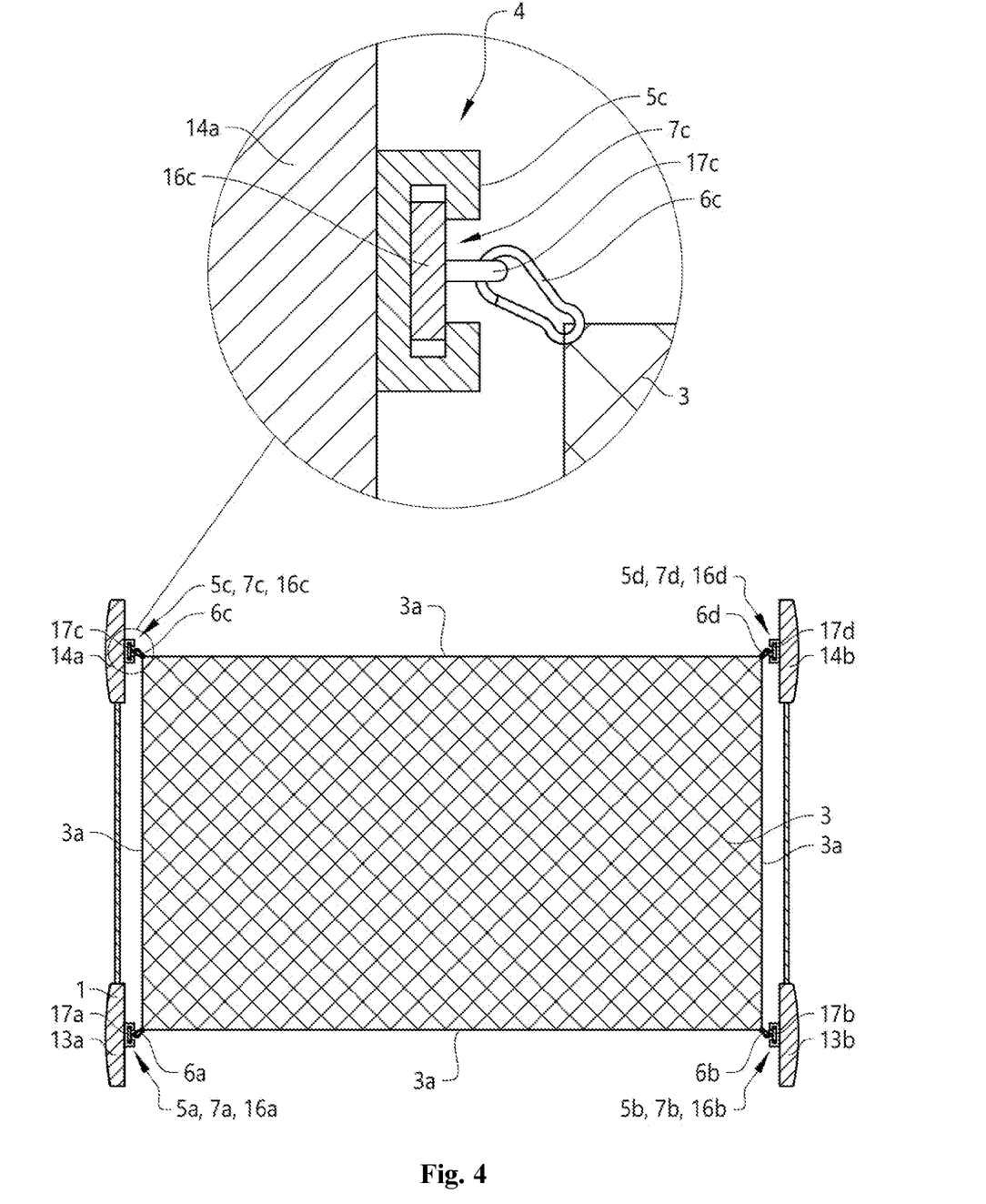
FIG. 4 shows schematically, in a view from above, the cargo restraining system, according to the disclosure.

The flexible structure 3 may be arranged as a flat flexible structure, such as for example a flexible net structure, as shown in FIGS. 1D and 4. The flexible net structure may be made of any suitable flexible net material, such as for example plastic materials or composite materials. Flexible metallic materials or structures may also be used if desired. The flexible structure 3 may be arranged with side edges of flexible material that are extending between parts of the positioning arrangement 4 for an efficient holding of the cargo C. The flexible structure 3 is adapted for holding the cargo C arranged on the cargo floor 1b of the vehicle cargo compartment 1a in position in relation to the cargo floor 1b. The flexible structure 3 is suitably sized to cover at least a part of the cargo floor 1b, and as shown in the illustrated embodiments, the flexible structure is arranged to cover a major part of the cargo floor 1b, see for example FIGS. 1C and 1D.

As shown in the figures, the positioning arrangement 4 is adapted for enabling movement of the flexible structure 3 between a storage position $P_{ST}$ and a load securing position $P_{LS}$. In the storage position $P_{ST}$, as illustrated in FIG. 1A, the flexible structure 3 is adapted to be positioned on a first height H1 from the cargo floor 1b. With positioned on a first height H1 is meant that the flexible structure 3 is arranged a certain distance from the cargo floor 1b, and in the shown embodiment a certain distance above the cargo floor 1b. The first height H1 is determined as an average height of the flexible structure 3 when arranged in a flat state in the storage position $P_{ST}$. It should be understood that different parts of the flexible structure 3 in the storage position $P_{ST}$ may be arranged on different heights in relation to the cargo floor 1b. In the storage position $P_{ST}$, the positioning arrangement 4 is adapted for positioning the flexible structure 3 in connection to, or in a direction towards, a ceiling structure 1c of the cargo compartment 1a, as shown in FIG. 1A, for easy access to the vehicle cargo compartment 1a when loading and unloading goods or objects.

Figure 2:
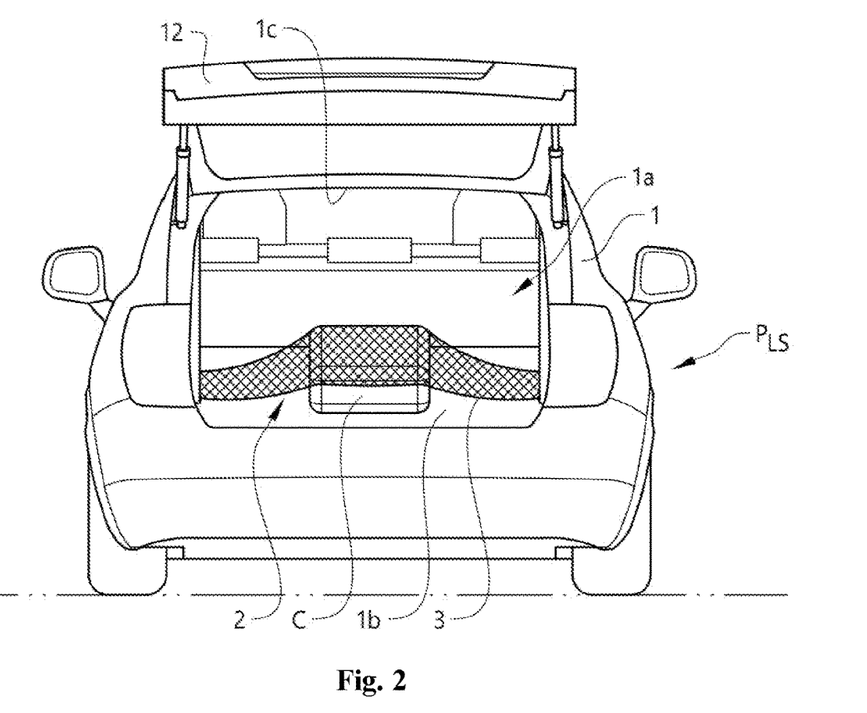
FIG. 2 shows schematically, in a perspective rear view, the cargo restraining system in a load securing position holding cargo, according to the disclosure.

In the load securing position $P_{LS}$, as illustrated in FIGS. 1C and 1D, the flexible structure 3 is adapted to be positioned on a second height H2 from the cargo floor 1b. With positioned on a second height H2 is meant that the flexible structure 3 is arranged a certain distance from the cargo floor 1b, and in the shown embodiment a certain distance above the cargo floor 1b. The second height H2 is determined as an average height of the flexible structure 3 when arranged in a flat state in the load securing position $P_{LS}$. It should be understood that different parts of the flexible structure 3 in the load securing position $P_{LS}$ may be arranged on different heights in relation to the cargo floor 1b. In the load securing position $P_{LS}$, the positioning arrangement 4 is adapted for positioning the flexible structure 3 in connection to the cargo floor 1b, as shown in FIGS. 1C, 1D and 2. In FIG. 2, a piece of cargo C is held in place by the flexible structure 3 in the load securing position $P_{LS}$. The flexible structure 3 is in the load securing position $P_{LS}$ stretched out over the cargo C for a secure and safe positioning in connection to the cargo floor 1b.

With the expression flat state above is meant that the flexible structure 3 is extending between parts of the positioning arrangement 4, with a flat or essentially flat shape. Due to the flexible nature of the flexible structure 3, and depending on materials used in the flexible structure 3, deviations from an entirely flat state, for example arising from gravity or other impacting factors, is included in the expression flat state, and allowed when determining the first height H1 and the second height H2.

As shown in the illustrated embodiment, the first height H1 is different from the second height H2, where the second height H2 is lower that the first height H1. When the flexible structure 3 is positioned on the first height H1 the distance between the cargo floor 1b and the flexible structure 3 is greater than the distance between the cargo floor 1b and the flexible structure 3 when the flexible structure 3 is positioned on the second height H2, which is illustrated in FIGS. 1A and 1C. In FIG. 1B, the flexible structure 3 is arranged in an intermediate position between the storage position $P_{ST}$ and the load securing position $P_{LS}$, which for example may be a position of the flexible structure 3 during displacement between the storage position $P_{ST}$ and the load securing position $P_{LS}$.

The positioning arrangement 4 comprises two or more holding devices 5, and the flexible structure 3 comprises two or more connection members 6 at different positions along an outer periphery 3a of the flexible structure 3. A positioning member 16 is movably connected to each holding device 5. Each connection member 6 is adapted to be connected to a corresponding positioning member 16.

In the embodiment illustrated in the figures, the positioning arrangement 4 of the cargo restraining system 2 comprises four holding devices 5a, 5b, 5c, 5d. The positioning arrangement 4 thus comprises a first holding device 5a, a second holding device 5b, a third holding device 5c, and a fourth holding device 5d. Each holding device 5a, 5b, 5c, 5d is formed as an elongated structure extending between the cargo floor 1b and the ceiling structure 1c, along a side of the vehicle cargo compartment 1a. The four holding devices 5a, 5b, 5c, 5d are arranged at different suitable positions within the vehicle cargo compartment 1a for holding the flexible structure 3.

The first holding device 5a and the second holding device 5b may suitably be arranged at D-pillars 13a, 13b of the vehicle 1, and/or the third holding device 5c and the fourth holding device 5d may suitably be arranged at C-pillars 14a, 14b of the vehicle 1. In the embodiment illustrated in FIG. 4, the first holding device 5a and the second holding device 5b are arranged at D-pillars 13a, 13b of the vehicle 1, and the third holding device 5c and the fourth holding device 5d are arranged at C-pillars 14a, 14b of the vehicle 1.

A positioning member 16a, 16b, 16c, 16d is movably connected to each holding device 5a, 5b, 5c, 5d. In the embodiment shown in the figures, a first positioning member 16a is movably connected to the first holding device 5a, a second positioning member 16b is movably connected to the second holding device 5b, a third positioning member 16c is movably connected to the third holding device 5c, and a fourth positioning member 16d is movably connected to the fourth holding device 5d. As further illustrated in for example FIGS. 3 and 4, the flexible structure 3 comprises four connection members 6a, 6b, 6c, 6d arranged at different positions along the outer periphery 3a of the flexible structure 3, and each connection member 6a, 6b, 6c, 6d is adapted to be connected to a corresponding positioning member 16a, 16b, 16c, 16d. Thus, in the shown embodiment, a first connection member 6a is connected to the first positioning member 16a, a second connection member 6b is connected to the second positioning member 16b, a third connection member 6c is connected to the third positioning member 16c, and a fourth connection member 6d is connected to the fourth positioning member 16d.

As described above, and illustrated in the figures, each positioning member 16a, 16b, 16c, 16d is adapted to be movably connected to a corresponding holding device 5a, 5b, 5c, 5d. Each holding device 5a, 5b, 5c, 5d comprises a track 7a, 7b, 7c, 7d, and each positioning member 16a, 16b, 16c, 16d is adapted to be slidably arranged in a corresponding track 7a, 7b, 7c, 7d for positioning the flexible structure 3 between the storage position $P_{ST}$ and the load securing position $P_{LS}$. The first positioning member 16a is movably connected to a first track 7a of the first holding device 5a, the second positioning member 16b is movably connected to a second track 7b of the second holding device 5b, the third positioning member 16c is movably connected to a third track 7c of the third holding device 5c, and a fourth positioning member 16d is movably connected to a fourth track 7d of the fourth holding device 5d.

Each holding device 5 is formed as an elongated structure extending between the cargo floor 1b and the ceiling structure 1c, as described above, and each track 7 has an elongated configuration that is extending along its corresponding holding device 5 between the cargo floor 1b and the ceiling structure 1c.

Figure 3:
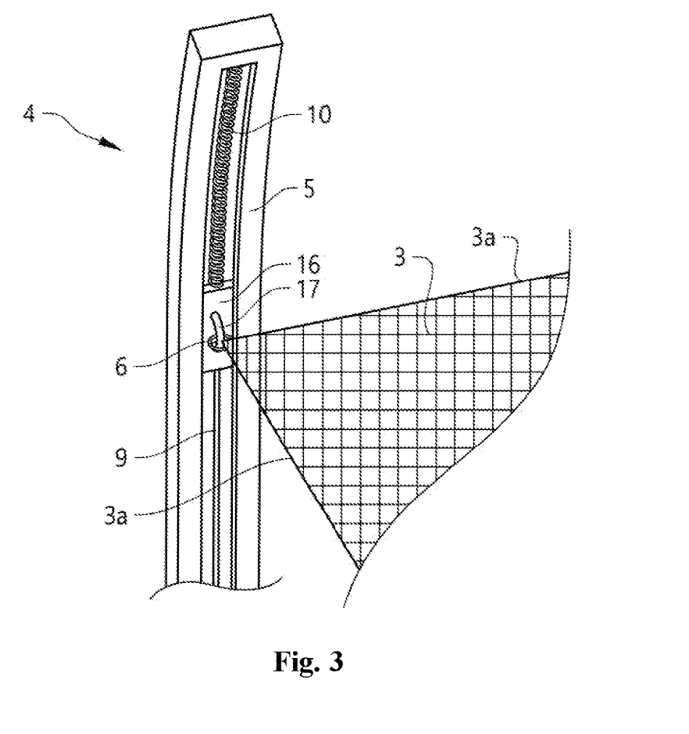
FIG. 3 shows schematically, in a perspective view, a section of the cargo restraining system, according to the disclosure.

As illustrated in the embodiment shown in FIG. 4, the holding devices 5a, 5b, 5c, 5d are arranged with C-shaped cross-sectional configurations, and the track 7a, 7b, 7c, 7d of each holding device 5a, 5b, 5c, 5d is formed by an opening partly enclosed by the C-shaped cross-sectional configuration. In FIG. 3, the extension of the track 7 along the holding device 5 is schematically illustrated. Each positioning member 16 is arranged as a sliding body that is free to move within its corresponding track 7, and the positioning member 16 may have any suitable shape for an efficient sliding movement. In the embodiment illustrated in FIG. 4, each positioning member 16a, 16b, 16c, 16d is having an essentially rectangular shape that is matching the shape of the corresponding track 7a, 7b, 7c, 7d. The holding devices 5a, 5b, 6c, 5d may be made of any suitable material or combinations of different materials, such as for example plastic materials, aluminium or other metallic materials, or composite materials. The positioning members 16a, 16b, 16c, 16d may be made of any suitable material or combinations of different materials, such as for example plastic materials, aluminium or other metallic materials, or composite materials.

The positioning arrangement 4 further comprises a spring 10 connected to each holding device 5. Each positioning member 16 is connected to the corresponding holding device 5 via the spring 10. Each spring 10 is adapted for displacing the corresponding positioning member 16 in relation to the corresponding holding device 5.

In the embodiment illustrated in the figures, each holding device 5a, 5b, 5c, 5d is arranged with a spring 10a, 10b, 10c, 10d connected to its corresponding holding device 5a, 5b, 5c, 5d. Each positioning member 16a, 16b, 16c, 16d is connected to the corresponding holding device 5a, 5b, 5c, 5d via the spring 10a, 10b, 10c, 10d, as shown in FIG. 3 and indicated in FIG. 1D. Thus, a first spring 10a is connecting the first holding device 5a and the first positioning member 16a, a second spring 10b is connecting the second holding device 5b and the second positioning member 16b, a third spring 10c is connecting the third holding device 5c and the third positioning member 16c, and a fourth spring 10d is connecting the fourth holding device 5d and the fourth positioning member 16d. Each spring 10a, 10b, 10c, 10d is adapted for displacing the corresponding positioning member 16a, 16b, 16c, 16d in relation to the corresponding holding device 5a, 5b, 5c, 5d. The springs 10a, 10b, 10c, 10d are configured for forcing the positioning members 16a, 16b, 16c, 16d in a direction upwards towards the ceiling structure 1c if the positioning members 16a, 16b, 16c, 16d are not forced in a direction downwards towards the cargo floor 1b with a force higher than the force exerted on the positioning members 16a, 16b, 16c, 16d by the springs 10a, 10b, 10c, 10d.

The flexible structure 3 may be releasably connected to the connection members 5a, 5b, 5c, 5d, via the connection members 6a, 6b, 6c, 6d and the positioning members 16a, 16b, 16c, 16d. The connection members 6a, 6b, 6c, 6d may be arranged as hooks, carabiners or similar structures attached to the flexible structure 3. In the embodiment illustrated in FIG. 4 the connection members 6a, 6b, 6c, 6d are configured as carabiner-like attachment members connected to the outer periphery 3a of the flexible structure 3. The connection members 6a, 6b, 6c, 6d are used for releasably connecting the flexible structure 3 to each of the positioning members 16a, 16b, 16c, 16d, and the flexible structure 3 can through the connection members 6a, 6b, 6c, 6d be removed from and attached to the corresponding holding devices 5a, 5b, 5c, 5d. The positioning members 16a, 16b, 16c, 16d may each be arranged with loops 17 or similar means for attaching the connection members 6a, 6b, 6c, 6d. In the illustrated embodiment, the first positioning member 16a is arranged with a first loop 17a for connection to the first connection member 6a, the second positioning member 16b is arranged with a second loop 17b for connection to the second connection member 6b, the third positioning member 16c is arranged with a third loop 17c for connection to the third connection member 6c, and the fourth positioning member 16d is arranged with a fourth loop 17d for connection to the fourth connection member 6d.

Each positioning member 16a, 16b, 16c, 16d is connected to an actuator 8. The actuator 8 is adapted for moving each positioning member 16a, 16b, 16c, 16d in relation to the corresponding holding device 5a, 5b, 5c, 5d and track 7a, 7b, 7c, 7d for positioning the flexible structure 3 between the storage position $P_{ST}$ and the load securing position $P_{LS}$. The actuator 8 may be of any suitable type, such as for example a linear actuator or an electric motor.

Each positioning member 16a, 16b, 16c, 16d is connected to the actuator 8 via a wire structure 9, and each wire structure 9 is adapted for displacing the corresponding positioning member 16a, 16b, 16c, 16d in relation to the corresponding holding device 5a, 5b, 5c, 5d upon activation of the actuator 8. The wire structure 9 may be a strap, wire, or rope of a suitable material, such as for example straps or ropes of plastic materials or metal wires. In the shown embodiment, a first wire structure 9 is connecting the first positioning member 16a to the actuator 8, a second wire structure 9 is connecting the second positioning member 16b to the actuator 8, a third wire structure 9 is connecting the third positioning member 16c to the actuator 8, and a fourth wire structure 9 is connecting the fourth positioning member 16d to the actuator 8. As schematically shown in FIGS. 1A-1D and 3, the wire structures 9 are running from the actuator 8 to the positioning members 16a, 16b, 16c, 16d, inside the tracks 7a, 7b, 7c, 7d of their corresponding holding devices 5a, 5b, 5c, 5d. The cargo restraining system 2 may be provided with guiding members, such as guiding wheels or pulleys, or similar means for guiding the wire structures 9 between the actuator 8 and the respective positioning member 16a, 16b, 16c, 16d. When the actuator 8 is pulling the wire structures 9, the positioning members 16a, 16b, 16c, 16d are moved in a direction downwards in relation to the holding devices 5a, 5b, 5c, 5d towards the floor structure 1b. When the actuator 8 is releasing the wire structures 9, the positioning members 16a, 16b, 16c, 16d are moved in a direction upwards in relation to the holding devices 5a, 5b, 5c, 5d towards the ceiling structure 1c due to the forces exerted on the positioning members 16a, 16b, 16c, 16d by the springs 10a, 10b, 10c, 10d. The actuator 8 may be configured with one or more pulleys or similar arrangements for displacing the wire structures 9. In the illustrated embodiment, only one actuator 8 is used for displacing the wire structures 9. However, it should be understood that two or more actuators could be used if suitable. As an example, each wire structure 9 may be connected to its own separate actuator 8.

The actuator 8 may further comprises force limiters that are preventing that the users of the cargo restraining systems are injured during use of the system. The force limiters are securing that the operation of the actuator is stopped when a predetermined force level is reached. Suitable force limiters are for example integrated in the actuator 8, as well known in the art, configured to stop the movement of the actuator above a specific force value.

A control unit 15 may be connected to the cargo restraining system 2 for controlling different system functions, and the control unit 15 may comprise one or more processors and one or more memories with necessary software and software applications.

The system 2 may further comprise a switch 11 connected to the control unit 15 for operating the actuator 8, as schematically shown in FIGS. 1A-1D. The switch 11 is used for controlling the movement of the flexible structure 3 between the storage position $P_{ST}$ and the load securing position $P_{LS}$. A user of the system can when operating the switch 11 choose to raise or lower the flexible structure 3 to tighten whatever type of cargo C is loaded onto the cargo floor 1c. The switch 11 may comprise one or more push buttons or similar elements for operating the actuator 8 in different directions. The holding devices 5a, 5b, 5c, 5d may further be arranged with switch elements connected to the control unit 15 for stopping the positioning members 16a, 16b, 16c, 16d in relation to the holding devices 5a, 5b, 5c, 5d when they have reached an upper position corresponding to the storage position $P_{ST}$ of the flexible structure 3, or when they have reached a lower position corresponding to the load securing position $P_{LS}$ of the flexible structure 3. The cargo restraining system 2 may further be configured for positioning the flexible structure 3 in any position between the storage position $P_{ST}$ and the load securing position $P_{LS}$, as for example the intermediate position shown in FIG. 1B.

In one embodiment, the cargo restraining system 2 further comprises an exterior vehicle door 12, such as a tailgate, arranged in connection to the vehicle cargo compartment 1a, as shown in FIG. 2. The flexible structure 3 is in this embodiment adapted for being automatically lowered in relation to the cargo floor 1b when the exterior vehicle door 12 is being closed, and/or the flexible structure 3 is adapted for being automatically raised in relation to the cargo floor 1b when the exterior vehicle door 12 is being opened. The opening and closing of the exterior vehicle door 12 may for example be remotely activated by a key fob, a smartphone, by a movement detection sensor, or other suitable sensor. In an alternative embodiment, the flexible structure 3 can be automatically lowered in relation to the cargo floor 1b when the vehicle starts moving, and automatically raised in relation to the cargo floor 1b when the vehicle is stopped and the exterior vehicle door 12 is opened. The cargo restraining system 2 may also be configured with an automatic function, where the actuator 8 will track the tension in the wire structures 9 and decide when the actuator 8 should stop depending on a pre-determined force level exerted on the actuator 8 from the wire structures 9. With such a function, the tension from the flexible structure 3 on the cargo C can be limited.

In further alternative embodiments, the flexible structure 3 is adapted for being automatically raised in relation to the cargo floor 1b when the user of the vehicle 1 is approaching the vehicle 1 or approaching the vehicle cargo compartment 1a, when the user of the vehicle 1 is carrying an object and is moving towards the vehicle 1 or moving towards the vehicle cargo compartment 1a, or when the user of the vehicle is unlocking the exterior vehicle door 12 of the vehicle cargo compartment 1a with a key, key fob, smartphone or other suitable unlocking device. The detection of an approaching person, or a moving person carrying an object, can be achieved for example by using an image sensor and image recognition software. Object detection software may be used for detecting specific objects. Facial recognition systems including hardware and software may be used for identifying a user of the vehicle, or the user may be identified by the key fob, smartphone or other identification device being within a certain distance or range from the vehicle 1. The image sensor or facial detection sensor used may for example be a camera or other suitable image detection device. The recognition and detection systems used may further involve the control unit 15, and the control unit 15 may be used for controlling the different identification and recognition functions of the system. The described functions for automatically raising the flexible structure 3 may be combined with an automatic opening of the exterior vehicle door 12 if desired.

When opening the exterior vehicle door 12, the cargo restraining system 2 may be manually operated by the user of the vehicle with the switch 11. Alternatively, the cargo restraining system 2 is automatically activated through the functions described above. The positioning arrangement 4 is adapted for enabling movement of the flexible structure 3 between the storage position $P_{ST}$ and the load securing position $P_{LS}$, in response to a manual or automated system activation. The flexible structure 3 is positioned on a first height H1 from the cargo floor 1b in the storage position $P_{ST}$, and the flexible structure 3 is positioned on a second height H2 from the cargo floor 1b in the load securing position $P_{LS}$, where the first height H1 is different from the second height H2. When the control unit 15 receives a signal to move the flexible structure 3 into the load securing position $P_{LS}$, the flexible structure 3 is moved in a direction downwards towards the cargo floor 1b for holding the cargo C in position in relation to the cargo floor 1b, as shown in FIG. 2. In FIGS. 1C and 1D, the flexible structure 3 is positioned in the load securing position $P_{LS}$ without any cargo arranged on the cargo floor 1b. When the control unit 15 receives a signal to move the flexible structure 3 into the storage position $P_{ST}$, the flexible structure 3 is moved in a direction upwards towards the ceiling structure 1c in relation to the cargo floor 1b, as shown in FIG. 1A.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the cargo restraining system 2, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as for example sensors arranged on the vehicle surface, an off-site server, or a cloud-based server.

The processor or processors associated with the cargo restraining system 2 may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (for example via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Vehicle
1a: Vehicle cargo compartment
1b: Cargo floor
1c: Ceiling structure
2: Cargo restraining system
3: Flexible structure
3a: Outer periphery
4: Positioning arrangement
5: Holding device
6: Connection member
7: Track
8: Actuator
9: Wire structure
10: Spring
11: Switch
12: Exterior vehicle door
13: D-pillar
14: C-pillar
15: Control unit
16: Positioning member
17: Loop
C: Cargo
$P_{ST}$: Storage position
$P_{LS}$: Load securing position

What is claimed is:

1. A cargo restraining system for a vehicle comprising an extended flexible structure movably connected to a positioning arrangement, wherein the flexible structure is adapted for holding cargo arranged on a cargo floor of a vehicle cargo compartment in position in relation to the cargo floor, wherein the flexible structure is sized to cover at least a part of the cargo floor, wherein the positioning arrangement is adapted for enabling movement of the flexible structure between a storage position and a load securing position, wherein in the storage position the flexible structure is adapted to be positioned on a first height from the cargo floor, wherein in the load securing position the flexible structure is adapted to be positioned on a second height from the cargo floor, wherein the first height is different from the second height, wherein the positioning arrangement comprises two or more holding devices, wherein a positioning member is movably connected to each holding device, wherein the flexible structure at different positions along an outer periphery comprises two or more connection members, wherein each connection member is adapted to be connected to a corresponding positioning member, and wherein each positioning member is connected to the corresponding holding device via a spring, wherein each spring is adapted for displacing the corresponding positioning member in relation to the corresponding holding device.

2. The cargo restraining system according to claim 1, wherein in the storage position the positioning arrangement is adapted for positioning the flexible structure in connection to a ceiling structure of the cargo compartment.

3. The cargo restraining system according to claim 1, wherein in the load securing position the positioning arrangement is adapted for positioning the flexible structure in connection to the cargo floor.

4. The cargo restraining system according to claim 1, wherein each holding device comprises a track, wherein each positioning member is adapted to be slidably arranged in a corresponding track for positioning the flexible structure between the storage position and the load securing position.

5. The cargo restraining system according to claim 1, wherein each positioning member is connected to an actuator, wherein the actuator is adapted for moving each positioning member in relation to the corresponding holding device for positioning the flexible structure between the storage position and the load securing position.

6. The cargo restraining system according to claim 5, wherein each positioning member is connected to the actuator via a wire structure, wherein each wire structure is adapted for displacing the corresponding positioning member in relation to the corresponding holding device upon activation of the actuator.

7. The cargo restraining system according to claim 5, wherein the actuator comprises force limiters.

8. The cargo restraining system according to claim 1, wherein the flexible structure is releasably connected to the two or more connection members.

9. The cargo restraining system according to claim 1, wherein the flexible structure is arranged as a flexible net structure.

10. The cargo restraining system according to claim 1, wherein the system further comprises a switch, wherein the switch is adapted for controlling the movement of the flexible structure.

11. The cargo restraining system according to claim 1, wherein the system further comprises an exterior vehicle door arranged in connection to the vehicle cargo compartment, wherein the flexible structure is adapted for being lowered in relation to the cargo floor when the exterior vehicle door is being closed, and/or wherein the flexible structure is adapted for being raised in relation to the cargo floor when the exterior vehicle door is being opened.

12. A vehicle, wherein the vehicle comprises a cargo restraining system according to claim 1.

13. The vehicle according to claim 12, wherein the first holding device and the second holding device are arranged at D-pillars of the vehicle, and/or wherein the third holding device and the fourth holding device are arranged at C-pillars of the vehicle.

14. A method for operating a cargo restraining system for a vehicle, wherein the system comprises an extended flexible structure movably connected to a positioning arrangement, wherein the flexible structure is adapted for holding cargo arranged on a cargo floor of a vehicle cargo compartment in position in relation to the cargo floor, wherein the flexible structure is sized to cover at least a part of the cargo floor, wherein the positioning arrangement is adapted for enabling movement of the flexible structure between a storage position and a load securing position, wherein the method comprises the steps: positioning the flexible structure on a first height from the cargo floor in the storage position, and/or positioning the flexible structure on a second height from the cargo floor in the load securing position, wherein the first height is different from the second height, wherein the positioning arrangement comprises two or more holding devices, wherein a positioning member is movably connected to each holding device, wherein the flexible structure at different positions along an outer periphery comprises two or more connection members, wherein each connection member is adapted to be connected to a corresponding positioning member; and wherein each positioning member is connected to the corresponding holding device via a spring, wherein each spring is adapted for displacing the corresponding positioning member in relation to the corresponding holding device.

15. A cargo restraining system for a vehicle comprising an extended flexible structure movably connected to a positioning arrangement, wherein the flexible structure is adapted for holding cargo arranged on a cargo floor of a vehicle cargo compartment in position in relation to the cargo floor, wherein the flexible structure is sized to cover at least a part of the cargo floor, wherein the positioning arrangement is adapted for enabling movement of the flexible structure between a storage position and a load securing position, wherein in the storage position the flexible structure is adapted to be positioned on a first height from the cargo floor, wherein in the load securing position the flexible structure is adapted to be positioned on a second height from the cargo floor, wherein the first height is different from the second height, wherein the positioning arrangement comprises two or more holding devices, wherein a positioning member is movably connected to each holding device, wherein the flexible structure at different positions along an outer periphery comprises two or more connection members, wherein each connection member is adapted to be connected to a corresponding positioning member, wherein each positioning member is connected to an actuator, wherein the actuator is adapted for moving each positioning member in relation to the corresponding holding device for positioning the flexible structure between the storage position and the load securing position, wherein each positioning member is connected to the actuator via a wire structure, wherein each wire structure is adapted for displacing the corresponding positioning member in relation to the corresponding holding device upon activation of the actuator, wherein when the actuator is pulling the wire structures, the positioning members are moved in a direction downwards in relation to the holding devices towards the floor structure, and wherein each positioning member is connected to the corresponding holding device via a spring, wherein each spring is adapted for displacing the corresponding positioning member in relation to the corresponding holding device, wherein when the actuator is releasing the wire structures, the positioning members are moved in a direction upwards in relation to the holding devices towards a ceiling structure due to the forces exerted on the positioning members by the springs.

* * * * *